Patented June 16, 1942

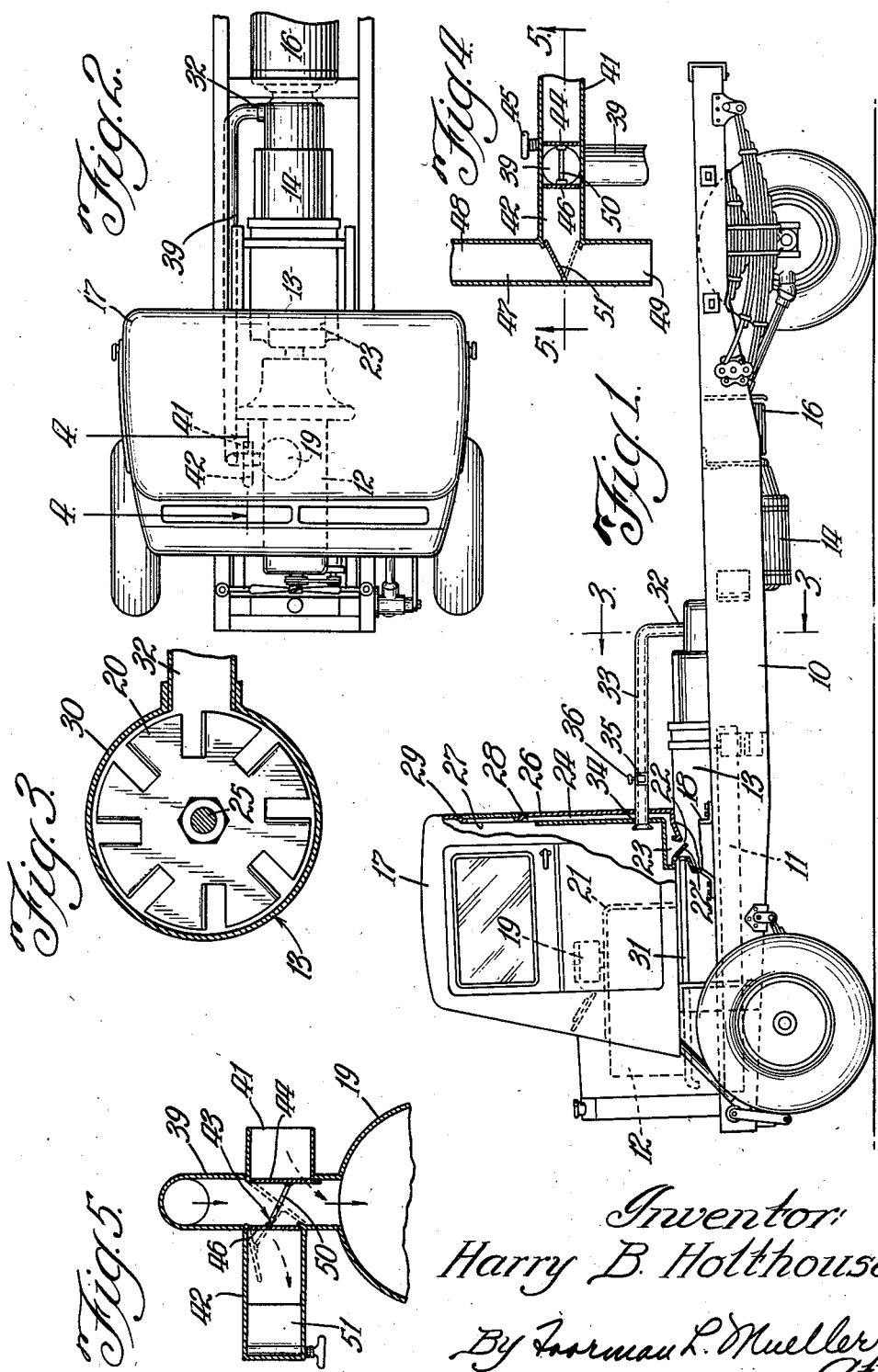

2,286,803

UNITED STATES PATENT OFFICE 2,286,803

TRUCK

Harry B. Holthouse, Chicago, Ill.

Application June 24, 1940, Serial No. 342,013

11 Claims. (Cl. 180—54)

This invention relates to trucks and in particular to trucks of gas-electric type. This application is a continuation in part of application Serial No. 110,086 filed November 10, 1936, and now Patent No. 2,205,999.

In its illustrated form the invention includes a truck frame, an internal combustion engine, a pair of generators carried by the frame and a cab straddling the engine. An object of the invention is to provide a simple and efficient cooling system for the cab.

A further object of the invention is to provide a supercharger for the truck engine which is cheap, compact, and efficient in operation.

A feature of this invention is the provision of a gas-electric truck in which the generator cooling air is utilized for supercharging the truck engine.

Another feature is the provision of a gas-electric truck in which the cab is air-cooled both by the air drawn into the generator for cooling the generator and by the air drawn into the engine intake manifold.

Yet another feature of this invention is the provision of a gas-electric truck in which the ventilating air for the generator is selectively controlled to heat the truck cab and to supercharge the truck engine.

A still further feature of the invention is the provision of a gas-electric truck in which the cab is both heated and ventilated by the generator air cooling system.

Further objects, features and advantages of this invention will appear from the following description when taken in connection with the accompanying drawing in which:

Fig. 1 is a general side view of the truck with the main truck body portion omitted and with parts broken away for the sake of clarity;

Fig. 2 is a fragmentary top plan view of the truck showing a modified form of the invention;

Fig. 3 is an enlarged sectional view taken approximately along the line 3—3 in Fig. 1 showing the generator cooling fan;

Fig. 4 is an enlarged detailed sectional view taken along the line 4—4 of Fig. 2, and Fig. 5 is a sectional detailed view as seen along the line 5—5 in Fig. 4.

Referring to Fig. 1 of the drawings, there is shown a truck including a main frame 10 and a sub-frame 11. An engine 12 and a generator 13 are mounted on the sub-frame and drive a motor 14 which drives the wheels through a transmission 16.

A cab 17 is supported in an engine-straddling position by brackets 18. It should be understood that because of the position of the cab over the motor, such cabs in the past have become very hot. According to the present invention, the cab is cooled in two ways, by the air intake for the engine and by the cooling air intake for the generator.

The engine intake 19 is positioned above the partition 21 between the engine and the cab, which partition is preferably insulated. The intake 19, therefore, draws a very large amount of air from the cab and a corresponding amount of air is drawn in through the windows and doors or between the joints. This rapid change of air carries away most of the heat which seeps into the cab from the engine.

It is conventional practice for the generator to have an air inlet 22 through which air is drawn by the generator cooling fan 20 on rotation of the generator. The fan 20 (Fig. 3) is mounted in the usual manner directly on the motor shaft 25 and is located within the motor housing 30. The air inlet 22 is connected by duct 23 to a space 24 formed between the back sheet metal covering 26 of the cab and the ply wood interior finish 27 thereof. An opening 28 between the passage 24 and the interior of the cab may be provided at any desired point, preferably slightly below the window in the cab. It should be understood that the back sheet 26 and the veneer 27 are secured to suitable risers 29 of which two may be positioned between the sides of the cab. It follows that the duct 24 although narrow in a front to rear direction is quite wide from side to side and therefore has adequate capacity.

Since the engine 12 and the generator 13 may at times draw too much air through the cab, making it too cold in the winter, it is desirable to provide a second duct 31 extending to a point near the front of the truck where clean air can be found, and a damper 22' for determining whether the air is drawn by the generator from the passage 24 or from the duct 31. Of course, the damper may be positioned in an intermediate position in which case some air will be drawn from both in a regulatable proportion.

It should be noted that connecting the generator and engine intakes to the cab not only cools the cab but has the additional advantage of providing clean air for these intakes. The dirt and dust of the road do not get into the cab in very great quantities, and that which does enter the cab has time to settle. It is also particularly desirable that no free moisture be carried into the generator and drawing the air through the cab is especially effective to eliminate such undesirable moisture.

A heating of the cab 17 is obtained in conjunction with the ventilating thereof, by utilization of the generator cooling air which is discharged at the generator outlet 32. This waste or exhaust air is heated to an appreciable degree on its passage through the generator, the cleanliness of the air making it ideal for heating purposes. A duct 33 is connected from the outlet 32 into the interior of the cab 17, the duct end 34 being suitably positioned beneath the seat (not shown) in the cab or in some other desirable location. An opening 35 is formed in the duct adjacent the outside wall portion of the cab 17. Suitable valve means 36 control the flow of air in the duct 33 to the cab and to the atmosphere. Opening of the valve 36 vents the heated air to the atmosphere, while a closing of the valve directs the heated air into the cab 17. It is obvious, of course, that the valve 36 could be located within the cab near the operator of the truck, with the duct 33 passing through a portion of the cab and outwardly therefrom to the atmosphere. Opening of the valve 36 would then vent the heated air into the cab 17, and a closing of the valve would dissipate the heated air to the atmosphere. By selectively controlling the valve 36, therefore, the cab 17 may be either heated and ventilated or it may be ventilated only to effect a maximum cooling thereof.

In the modified form of the invention shown in Fig. 2 parts similar to those described in connection with Fig. 1 will be designated by similar numerals of reference. The assembly of the engine 12, generator 13, and cab 17 is similar to the assembly of these parts in Fig. 1.

The cooling or ventilating air for the generator 13 is drawn through the passages 24 and 23 into the inlet 22 and is discharged from the generator through the outlet 32, this flow of air being produced by the generator fan or impeller 20. A duct 39 is connected from the outlet 32 to the engine intake 19, which is located within the cab 17, and is provided near the intake 19 with oppositely disposed passages 41 and 42 (Figs. 4 and 5). Selective communication of these passages with the duct 39 is made by a damper assembly 43 which includes vanes or louvers 44 and 46 which control the flow of air through the passages 41 and 42, respectively. The vanes are operated together by the control handle 45 through the connecting link or lever 50. The passage 41 is open to the interior of the cab 17. The passage or duct 42 is in a T-connection with a duct 47, one end 48 of which is open to the interior of the cab and the opposite end 49 of which is open to the atmosphere. A valve or damper 51 arranged in the duct 47 regulates the division of the flow of air from the duct 42 to the ends 48 and 49 of the passage 47.

With the louvers 44 and 46 arranged as shown in full lines in Fig. 5, the waste air from the generator in duct 39 is entirely passed into the engine intake 19 whereby to supercharge the engine 12. Since the generator 13 is in direct connection with the engine 12 the supply of air through the duct 39 will be directly proportional to the engine speed so that sufficient air for efficient engine operation will be supplied at all times. The damper 44 in its full line position closes the passage 41, so that air from the cab 17 is withdrawn only through the cab inlet opening 28 by the generator. Thus when the engine is being supercharged the cab 17 is cooled only by the action of the generator. In one embodiment of the invention the generator fan produces an air pressure at the intake 19 on the order of about six inches of water, which pressure effects about a twenty per cent increase in the operating efficiency of the engine. Improved engine performance is thus obtained by utilization of a part of the generator structure per se, namely, the ventilating system thereof.

On arranging the vanes 44 and 46 in their dotted line position, the air from the duct 39 is entirely diverted from the engine intake 19 and is by-passed into the passage 42, by the vane 46; the vane 44 closing the duct 39 and connecting the intake 19 with the interior of the cab 17. Air is thus withdrawn from the cab both by the engine intake 19 and by the generator 13, and the engine 12 is no longer supercharged. The air by-passed from the duct 39 into the passage 42 is selectively controlled by the valve 51 for passage into the interior of the cab 17 or to the atmosphere. With valve 51 in its full line position, as shown in Fig. 4, the heated generator air is expelled to the atmosphere from the end 49 of the duct 47 so that a complete ventilation and consequent maximum cooling of the cab 17 is obtained. On manipulation of the valve 51 to its dotted line position the heated air is directed into the cab 17 from the duct end 48 so that the cab is both heated and ventilated; the ventilation being accomplished by the withdrawal of the air from the cab at the intake 19 and by the generator at the opening 28.

The invention thus provides for a gas-electric truck in which the air supplied to the engine intake and to the self-cooling generator is withdrawn from the truck cab so as to effectively cool the cab. The air discharged from the generator is both heated and under pressure, and readily adapted for heating the cab or for supercharging the engine; the heating or supercharging being a matter of selection on the part of the truck operator. Regulating valves in the air ducts provide for a selective control of the air passing therethrough so that cab ventilation only, cab ventilation with heating, or cab ventilation in conjunction with a supercharging of the engine are easily obtained. It is to be understood, of course, that the valves can be arranged in the dashboard so as to be readily accessible to the truck operator.

It is to be understood also, that only preferred embodiments of the invention have been illustrated and described herein, and that alteration and modifications thereof can be made which are within the full intended scope of the invention as defined by the appended claims.

I claim:

1. A vehicle including a generator which draws a large amount of air for self-cooling, a vehicle body, a duct from the interior of said body to said generator to ventilate such generator by said air and to insure a relatively clean supply of air from said generator, a passage for said air independent of said body, and means for controlling the division of air flow from said body and from said passage.

2. A vehicle including a generator which draws a large amount of fresh air for self-cooling, a vehicle body, a duct from the interior of said body to said generator to cool said generator by said air, a passage for conducting the exhaust air from said generator to said body, and means for controlling the division of air from said passage to said body and to the atmosphere.

3. In a vehicle, the combination of an engine and a generator which draws a large amount of air for self-cooling, a body over said engine and heated thereby on account of its position, said engine having an air intake in said body to draw air therefrom to cool said body, a duct from the interior of said body to said generator for supplying ventilating air to said generator, a second duct from said generator to the interior of said body for supplying air heated by the generator to said body, and means in said second duct for controlling the division of said heated air to said body and to the atmosphere.

4. In a vehicle, the combination of an engine and a generator which draws a large amount of air for self-cooling, a body over said engine and heated thereby on account of its position, said engine having an air intake in said body, and an air duct from the interior of said body to said generator for ventilating said generator, the drawing of air through said intake by the engine and through said air duct by said generator serving to cool said body.

5. A vehicle including a generator which draws a large amount of air for self-cooling, a vehicle body, a duct from the interior of said body to said generator to ventilate said generator by said air and to insure a relatively clean supply of air for said generator, a passage for said air independent of said body, a second duct from said generator to the interior of said body for supplying air heated by said generator to said body, means for controlling the division of air flow from said body and from said passage, and means for controlling the division of the air flow in said second duct to said body and to the atmosphere.

6. In a vehicle, the combination of an engine and a generator which draws a large amount of air for self-cooling, said engine having an air intake, and said generator having an air inlet and an air outlet, a body over said engine and heated thereby on account of its position, a duct from the interior of said body to the inlet of said generator for supplying ventilating air to said generator, the withdrawal of said air from the body serving to cool said body, and a second duct from said generator outlet to said air intake for supercharging said engine.

7. In a vehicle having a body, the combination of an engine and a generator which draws a large amount of air for self-cooling, said engine having an air intake in said body, and said generator having an air inlet and an air outlet, a duct from the interior of said body to said generator inlet for supplying ventilating air to said generator, a second duct from said generator outlet to said air intake, and means for selectively controlling the flow of air in said second duct to said air intake and to said body.

8. In a vehicle, the combination of an engine and a generator which draws a large amount of fresh air for cooling, a vehicle body, said engine having an air intake in said body, and said generator having an air outlet, a duct for conducting the exhaust air from said generator outlet to said engine intake, and means in said duct for selectively controlling the flow of air therein to said air intake and to said body.

9. In a vehicle, the combination of an engine and a generator which draws air for self-cooling, a vehicle body, said engine having an air intake and said generator having an air inlet and an air outlet, a recirculating air duct from the interior of said body to said air inlet, a fresh air duct independent of said body and connected with said air inlet, and a third duct for conducting the exhaust air from said generator outlet to said engine intake to supercharge said engine.

10. In a vehicle, the combination of an engine and a generator which draws air for self-cooling, a vehicle body, said engine having an air intake and said generator having an air inlet and an air outlet, a recirculating air duct from the interior of said body to said air inlet, a fresh air duct independent of said body and connected with said air inlet, means for controlling the division of air through said recirculating and fresh air ducts to said generator inlet, and a third duct for conducting the exhaust air from said generator outlet to said engine intake to supercharge said engine.

11. In a vehicle, the combination of an engine and generator which draws air for self-cooling, a vehicle body, said engine having an air intake in said body, and said generator having an air inlet and an air outlet, a recirculating air duct from the interior of said body to said generator inlet, a fresh air duct independent of said body and connected with said generator inlet, means for controlling the division of air through said recirculating and fresh air ducts to said generator inlet, a third duct from said generator outlet to said engine air intake, and means for selectively controlling the flow of air in said third duct to said air intake and to said body, with the air delivered to said air intake serving to supercharge said engine.

HARRY B. HOLTHOUSE.